US005413618A

United States Patent [19]
Penningsfeld et al.

[11] Patent Number: 5,413,618
[45] Date of Patent: May 9, 1995

[54] METHOD FOR THE PRODUCTION OF A PEAT SUBSTITUTE, INSTALLATION FOR IMPLEMENTING SAID METHOD, DRYING DEVICE, APPLICATION OF SAID METHOD, AND PEAT SUBSTITUTE PRODUCED ACCORDING TO SAID METHOD

[75] Inventors: Franz Penningsfeld, Freising, Germany; Gerhard Baumann, Ittigen, Switzerland

[73] Assignee: IUP Institut für Umweltpflege AG, Ittigen, Switzerland

[21] Appl. No.: 955,269

[22] Filed: Oct. 1, 1992

[51] Int. Cl.⁶ .............................................. C10L 5/02
[52] U.S. Cl. ....................................... 44/490; 44/491; 44/492; 71/23; 71/24
[58] Field of Search .................. 44/490, 491, 492; 71/23, 24

[56] References Cited

U.S. PATENT DOCUMENTS

| | | | |
|---|---|---|---|
| 2,498,480 | 2/1950 | Bierlich et al. | 71/23 |
| 2,574,027 | 11/1951 | Farber | 71/24 |
| 2,985,643 | 5/1961 | Boomer et al. | 71/24 |
| 3,877,920 | 4/1975 | Carlberg | 71/21 |
| 4,571,254 | 2/1986 | Wahlberg | 71/23 |
| 5,114,457 | 5/1992 | Evans | 71/23 |

FOREIGN PATENT DOCUMENTS

| | | |
|---|---|---|
| 0147349 | 7/1985 | European Pat. Off. |
| 0324689 | 7/1989 | European Pat. Off. |
| 8303999 | 11/1983 | WIPO |
| 8503192 | 8/1985 | WIPO |

*Primary Examiner*—Jacqueline V. Howard
*Attorney, Agent, or Firm*—Marks & Murase

[57] ABSTRACT

Organic materials, more particularly wood and woody parts of plants, are intensely crushed, defibrated, heated and physically broken up in a thermal screw press, an impregnation with previously added auxiliary substances being simultaneously effected. The thus prepared material has a peat-like appearance and provides optimal physical, chemical and biological properties for its use as a peat substitute and substrate component. Inter alia, it is suitable as an additive for the physical upgrading of strongly decomposed peat varieties and for drawing out and better aeration of peat and culture substrates produced on the base of peat. When vaccinated with suitable fungi or microorganism, it is also very advantageously used for the mycorrhization of mycotrophic plants and as an additive for the production of high-grade composts.

22 Claims, 1 Drawing Sheet

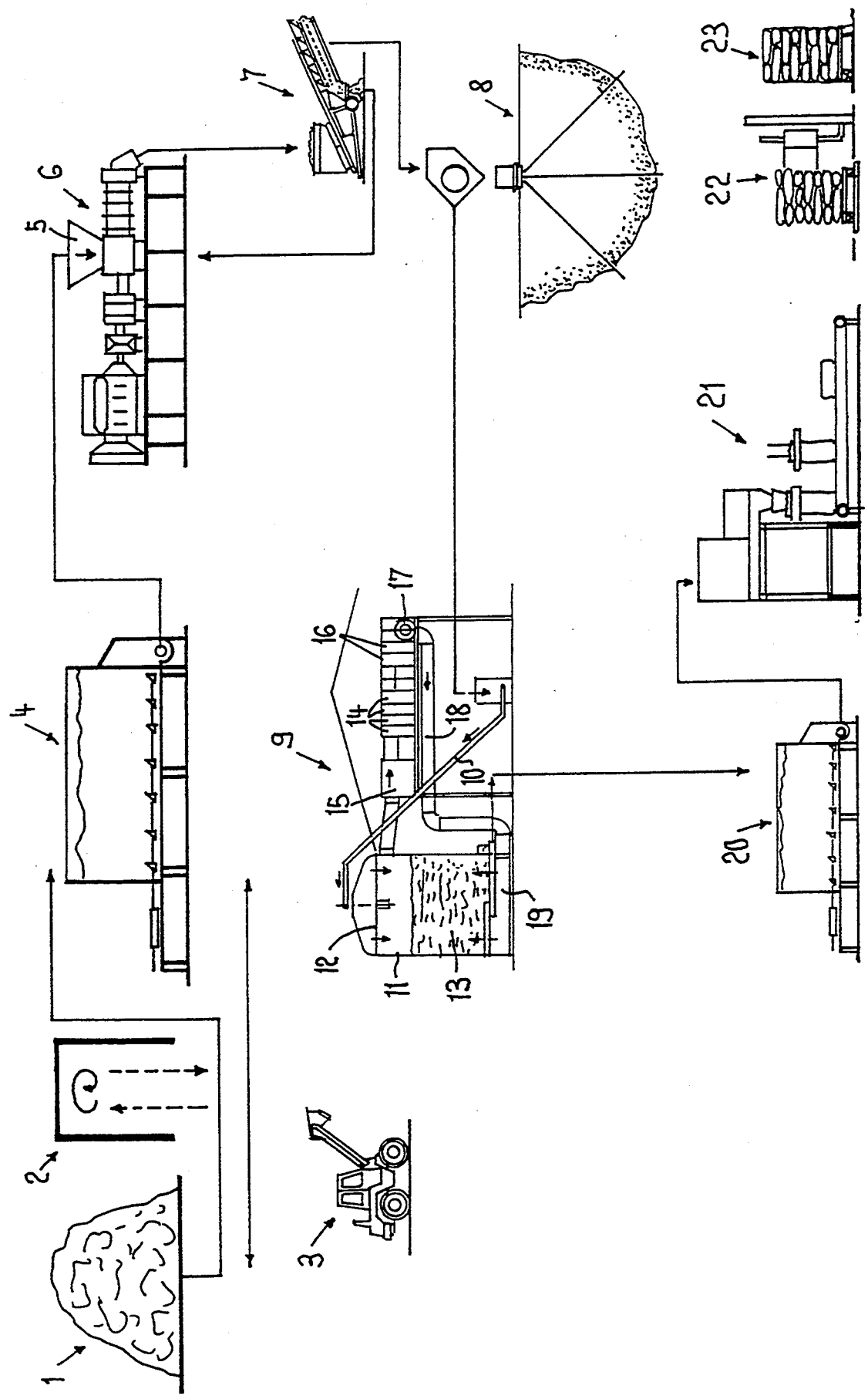

METHOD FOR THE PRODUCTION OF A PEAT SUBSTITUTE, INSTALLATION FOR IMPLEMENTING SAID METHOD, DRYING DEVICE, APPLICATION OF SAID METHOD, AND PEAT SUBSTITUTE PRODUCED ACCORDING TO SAID METHOD

The present invention refers to the production of high-quality peat substitute from organic materials, in particular from woody materials. The particular purpose thereof is to replace the moor peat used until now for the production of humic fertilizers, gardening soils and peat cultivating substrates with an equivalent material because the exploitation of moors and the use of peat for these purposes will have to be restrained for reasons of environmental protection and natural conservation. This is made possible by the described procedure using waste wood which would hardly be utilizable otherwise.

It appears in different technical publications that various products are used as "peat substitutes" today. This applies e.g. for plastics granulates, rice husks, bark compost, coconut fibers, sawdust, planing chips, etc. None of the hitherto recommended products, however, has all the essential characteristic properties of lightly decomposed moor peat, i.e. a low pH, a low nutritient content, a low microbiological activity, absence of pathogenes, a high content of valuable organic substances, adsorption capacity and a good degradation resistance, as is the case with the wood fiber produced according to the described method.

EP-A-0,147,349 discloses a method for the production of cultivating substrates by steaming and subsequently defibrating certain wood types, the fibers being mixed with other materials without further treatment. This method has different drawbacks. In particular, a high energy expenditure is required. Modifications of the fiber structure are only possible in a very limited range, the production sequence is complicated and requires high investments, and an impregnation is neither provided nor possible in the framework of the method.

No one of these known methods is technically and economically suitable for the production of a high-grade peat substitute. In contrast, the described method allows an optimal preparation both physically and chemically of almost any wood types or woody materials and thereby to produce a high-value peat substitute. Moreover, the production sequence includes a preliminary drying on account of the heating, said drying possibly being completed by a connected drying installation.

The invention provides a method for the production of a peat substitute from organic substances, in particular from woody materials, wherein said materials are crushed, defibrated, triturated and physically broken up in a preparation installation under high pressure and preferably under heating, an impregnation with auxiliary substances being simultaneously performed which confers the product properties which are similar to those of peat and makes it suitable for the cultivation of plants even without composting. For different reasons, it has been found to be advantageous to produce the material in a thermal screw press (hereinafter shortly referred to as TSP), e.g. according PCT/CH 83/00059. Hereby an optimal physical preparation of the material is achieved while an in-depth impregnation with different additives is simultaneously performed. Said auxiliary substances, such as mineral dust, partly increase the friction between the often slick and wet raw material and the screws of the TSP, and on the other hand, improve the physical, chemical or biological long-term properties of the fibrous material when pressed or incorporated therein, this being adjustable in an optimal manner for the intended purpose. The distinct possiblities will be discussed below.

The invention further provides an installation for implementing the method of the invention, comprising a preferably thermal screw press which is combined with one or a plurality of the following installation components:

(a) a preceding mixing and proportioning station for the addition of auxiliary substances to said organic material;
(b) a preceding preliminary drying, sorting, and/or comminuting device for the determination of the dimensions of the material pieces to be broken up;
(c) a following device for reheating and/or sterilization of the material which is broken up;
(d) a following sorting and evaporating device (preliminary drying), e.g. an oscillating screen (sieving) or a cyclone, in view of eliminating excessively coarse material pieces and returning the same to said thermal screw press or to another utilization;
(e) a following drying device for drying the broken material to a determined moisture content.

These parts of the installation are preferably provided but may be combined at will. The double screw preparating device TSP again forms the centerpiece of the installation, said device being preceded or followed by certain aggregates in view of an optimal preparation and aftertreatment of the material to be processed.

Said installation is independent as to its location, in particular with respect to the preparation of the material. Especially, its application in delevoping countries or in all places where organic, fibrous materials are still being destroyed by combustion, is possible and useful.

The final product may preferably be dried to a moisture content of 20 to 45%. The preparation mode of the material allows an advantageous preliminary drying which may be completed by a drying device such as a belt dryer or a cyclone. The invention provides a drying device, in particular for drying fibrous materials or mixtures, comprising a closed drying air circuit including a heat exchanger which is cooled by a heat pump, in order to extract moisture from the air, as well as a heater which is heated by said heat pump, and means for regulating the humidity and the temperature of the air at the entrance of a drying chamber through which said material is conveyed countercurrently with respect to the air. Preferably, a silo-type drying chamber is provided into which the material enters from the top and from which it is discharged at the bottom. Such a drying device is simple in construction an economic in operation, as will be explained in more detail.

The invention also refers to a particular application of the method described above and of the produced peat substitute for upgrading weakly structured peat, more particularly black peat, wherein said peat is mixed with said fibrous material before or after said breakup and may subsequently be dried, preferably in the drying device of the invention. This particular application allows a decisive improvement of too strongly decomposed, weakly structured peat varieties, in particular black peat, whose storage and utilization is problematic, a product being obtained which largely corresponds to usual peat by admixture of the fibrous material of the invention to these varieties. The mixture of said peat and said fibrous material may be dried in particular in the drying device described above and subsequently packed, pressed or transported in bulk, and stored like normal peat.

The invention further refers to a peat substitute, consisting of fibrous wood or woody, preferably sterile material which is broken up under pressure by squeezing and whose fibers are preferably 5 to 30 mm in length.

The invention is now explained in more detail with reference to an exemplary embodiment of the installation of the invention and alternative embodiments. The drawing shows a schematic illustration of said installation.

The illustrated installation comprises a schematically indicated raw material storage facility 1 from where said raw material can be supplied to a mixing device 2. Here, raw materials of different kinds may be mixed, and auxiliary substances may be added. The material is then passed to a metering and proportioning device 4, the transport between installation parts 1, 2, and 4 being effected by means of a power shovel. From metering and proportioning device 4, the material is supplied by a conveyor belt or the like to the filling funnel of a thermal screw press TSP 6. In said TSP, the material is squeezed and triturated between two screws which are driven in opposite directions and interlock with little clearance, and it leaves the device in a defibrated state. More than two screws, in particular four, may be provided as well.

Non-represented, adjustable baffle plates or other corresponding devices are provided which allow to regulate the flow and thus to determine for how long the material remains in said TSP and how intensely it is consequently treated and broken up, the warming of the material due to the mechanic treatment having an essential importance. If required, a heating or cooling facility may be provided in order to control the warming of the material.

The exiting material then proceeds to an oscillating screen 7 through which material particles of the desired dimensions will pass while too coarse pieces are returned to the entrance of said TSP in order to be further broken up and comminuted. However, too coarse particles may also be conducted to another suitable utilization directly.

The sieved material is then fed to a scraper combination 8 from where it proceeds to drying device 9. The material entering said drying device is conveyed by means of a conveyor 10 to the top of a silo-type drying chamber 11 where it is evenly spread out on the surface of a material pile 13 which is present in said drying chamber by a distributing device 12. Said material pile rests on an air-permeable floor from where it can be discharged by discharging device which is not represented in particular. The drying air circulates in a closed circuit and proceeds from the upper side of said drying chamber to a multiple-stage condenser 14. Said condenser comprises a plurality of cooling elements which are connected in series with respect to the air passage and disposed at a distance from each other, and wherein the passing air is cooled and the moisture contained therein is partly condensed. The arrangement of several individual cooling elements or condensers is advantageous in that it is possible to keep these elements relatively short in the passing direction of the air, so that they are relatively easy to clean. Indeed, it can be expected that in the process of drying the broken fibrous material, a considerable amount of dust is carried along which cannot be completely absorbed in a filter 15. The cooling elements or condensers 14 are cooled by a heat pump which serves for the heating of air heaters 16. A fan 17 circulates the drying air which passes into space 19 underneath pile 13 through duct 18.

The installation is provided with measuring sensors which detect the air temperature below and above material pile 13. If the difference between the measured temperatures is low, which points to a small evaporation in the material, the circulated air volume will be reduced whereas it is increased when the temperature difference is high in order to adapt the drying effect to the requirements. In addition, the air is fed to the drying chamber at a determined, controlled temperature and relative humidity, which determines the moisture content of the lowermost layers of material 13, provided that the dwelling time of the material in the drying device is long enough. As mentioned, said dwelling time may be comprised between 3 and 12 hours.

The material, which is dried to a moisture content of 20 to 30%, is then passed to an additional metering device 20, from where it proceeds to a bagging device 21. Another installation component 22 may be provided wherein material bales are wrapped in plastics sheets, whereupon said bales are brought to a storage facility 23.

After having described the installation and thereby also the outlines of the method for the production of peat substitute, the particulars of said method shall now be discussed. Tests over several years have shown that different wood types and plants may be used as a raw material, more particularly wood chips, brush cuttings, and sometimes also wastes from the paper industry. A controlled, regular product may be obtained from chemically and physically heterogenous products, e.g. wood chips of different grain sizes, by purposeful preparation, in particular by determination of the particle size. An ideal size of the chips or shavings, for example, is 5 to 30 mm in length, 10 to 20 mm in width and 5 to 10 mm in thickness. The structure, i.e. the size and the mechanical properties of the particles, is largely determinative of the treatment effect in the production process, short chips generally resulting in a finer, more uniform structure of the final product, whereas longer chips partly also result in products with long fibers and a proportion of coarse fibers. The classification may be effected by sieving and additionally also by an adequate comminution. The raw material may also be mixed with dry or humid additives which create favorable conditions for the subsequent breakup in the TSP in a purely mechanical respect, e.g. by drying and/or roughening the surface. It is further possible to heat and sterilize the raw material before breaking it up in the TSP. Preferred raw materials to be used are whitewood, fir wood, poplar wood, reducing chips (i.e. chips of roots or portionsnear the roots of trees), peeler shavings, topping chips, peeled tree sections, brush cuttings, and partly clean paper sludges, reducing chips stemming from felled trees being advantageously used. Said reducing chips and poplar wood comprise fibers which are resistant to biological decomposition, which is desired in the production of peat substitute.

The chemical and partly also the mechanical properties can be influenced by the admixture of different additives, in particular rock dust, argillaceous minerals, principal and micronutrients, charcoal, activated carbon, brown and hard coal, sand, acids, lyes, dyestuffs, fungicides, growth promoting agents, wetting agents, fertilizers, pesticides, stabilizers, deodorants, fragrances, trace elements, pH regulators and the like. Bioactive substances may also be admixed, such as bacteria cultures, if the material is intended for composting exclusively. Now, a particularly important aspect of the invention is the fact that not only an intensive defibration of the starting material is effected in the used TSP, but also that said material or the resulting fibers or flakes are intensely kneaded, crushed, heated and actually impregnated or vaccinated with the auxiliary substances and additives between the two screws of the TSP. Consequently, an extremely intense treatment of the fibrous material with said auxiliary substances is effected, whereby particularly favorable conditions for an aftertreatment and an optimal final product are obtained. The final product can be influenced qualitatively since an intense, durable union of the raw material and auxiliary substances and active ingredients is achieved. Fertilizer recommendations may largely be derived from peat cultures, i.e. the conditions for the elaboration of recipes and fertilizer recommendations are similar to those of natural peat. Correspondingly, the experiences gained in this field can largely be applied to the wood fiber obtained with the present method and may be adapted to the intended application while said auxiliary substances are precisely measured and uniformly incorporated by machine. If it appears suitable, it is also possible to increase or regulate the degradation resistance and the wetting capacity of the wood fibers by specifically acting additives, and similarly, the capillary absorbency and water retention. Eligible additives here are different argillaceous minerals, finely ground rock dusts, perlite, vermiculite, etc., among others.

Furthermore, the following measures are possible:

Adjustment of the desired water content, of the fiber structure, the capillarity and the water retention;

Production of mixtures before or after the breakup;

Influence on the degradation resistance by addition of natural or chemical products (pesticides, fungicides, etc.).

The structure of the final product, i.e. of the broken raw material and its impregnation or vaccination with auxiliary substances, is dependent on the water content of the raw materials. It has been found that a water content between 45 and 60% in combination with a rough, adherent surface yields optimal results. Corresponding materials can be selected at the time of buying already, or the material can be predried in order to render its surface more adherent, or else, friction-increasing additives such as mineral dust, brown or hard coal, grit, granulate or the like may be admixed.

The degree of breaking may be adjusted by the dwelling time of the material in the TSP or by using additional screw pairs, whereby an improved breakup and an increased heating are achieved.

Structure corrections may also be achieved by sieving. The material may also be sterilized before the breakup, but it is generally possible to obtain a partial sterilization already by the heating in the TSP. The heating can be effected at more than 100° C. Among other things, said heating of the broken product contributes to the subsequently desired water extraction, the material being allowed to cool off and evaporate on vibrating screen 7. The evaporation may be intensified by aeration by means of fans, longer transport belts or long dropping distances and the like.

In practice, a preparation of the wood fibers with white or black peat, brown coal, activated coal, charcoal and similar substances has been particularly successful. The impregnation according to the invention of the material with these products of vegetal origin leads to typically peat-like porperties. The use of preferably tertiary brown coal or of soft, pulverulent young brown coal has a positive effect on plant growth. After its application, high-grade varieties of durable humus are formed in the earth.

By the addition of special dyestuffs, it is possible to dye the wood fibers during the production sequence in such a manner that they are hardly distinguishable from natural peat in appearance.

In order to increase the capillarity, i.e. the water retention capacity, an absorbent material such as cellulose fibers, waste paper, cotton, argil or clay and the like may be added before or after breaking.

The represented installation may also be used very advantageously in the production of compost. In this case, slightly different raw materials will be used, in particular greenage, i.e. tree and brush cuttings, garden and cemetery wastes, grass and lawn cuttings, leaves, and possibly also organic kitchen wastes. However, it is quite possible to use a proportion of more woody raw materials as well. Also in this application, it has been found that the preparation in the mentioned TSP is very advantageous. The resulting surface available for biological degradation is substantially greater after the breakup than with usual preparations such as shredding. But also the possibility of impregnating or vaccinating the organic raw materials with auxiliary substances in an extremely intense and uniform manner, which has been detailedly explained above, is of great importance. For example, a vaccination with bacteria may be effected, and/or an impregnation with fertilizers or generally nitrous substances or with albumens, in order to accelerate the decay. The decay of the broken material occurs best at a humidity of 45 to 55%. This humidity can already be attained by simple evaporation of the material after leaving the TSP, but drying device 9 may also be used in order to bring the material to an optimal moisture content for stack composting. After the decay, the compost can also be advantageously dried by means of drying device 9 and packed into sacks. Composite products may be produced as well, e.g. by mixing the peat substitute of the invention with compost, drying and packing it.

Basically, auxiliary substances and additives can be supplied or admixed at any suitable location of the installation, before or after the TSP, e.g. directly and continuously together with the material to be broken up at the entrance of the TSP. Certain additives, e.g. compost, may be added before or after vibrating screen 7.

We claim:

1. A method for the production of a peat substitute from organic substances, in particular from woody materials, wherein said materials are impregnated with auxiliary substances by crushing, defibrating, triturating and breaking up in a breaking machine under high pressure together with said auxiliary substances, said impregnation with auxiliary substances conferring upon the product properties which are similar to those of peat and makes it suitable for the cultivation of plants without composting.

2. A method for the production of a peat substitute from organic substances, wherein woody material is mixed with active ingredients and auxiliary substances comprising fertilizers, pesticides, fungicides, wetting agents, dyestuffs, stabilizers, deodorants, fragrances, peat, coal, charcoal, brown coal, activated carbon, organic and/or mineral dusts, bacteria preparations or pH regulators before it is processed, said material being subsequently crushed and defibrated, for impregnating it with said active ingredients and auxiliary substances.

3. The method of claim 2, wherein said active ingredients are mixed with buffering substances before said mixing with the woody material.

4. The method of claim 1, wherein the method further comprises a heating step and wherein the duration or the intensity of the breaking process and the heating of said material are adapted to the following treatment and to the intended application, temperatures of 60° to 120° C. being chosen for the production of a sterile peat substitute.

5. The method of claim 4, wherein said heating is effected after the discharge of said material from said breaking machine.

6. The method of claim 5, wherein after discharge from said breaking machine or from said heating, said material is brought to a vibrating screen or into a cyclone to sieve and dry said material.

7. The method of claim 1, wherein before said breakup, said material is comminuted or classified in view of limiting the fiber length and brought to a moisture content of 45 to 60%, and wherein the broken material is dried to a moisture content of 20 to 45%.

8. The method of claim 1, wherein the materials leaving said breaking machine are mixed with other products and subsequently forwarded to a direct utilization or to a drying installation.

9. The method of claim 1, wherein clean, absorbent material is added in view of increasing the capillarity, i.e. the water retention capacity.

10. The method of claim 1 for upgrading weakly structured peat, more particularly black peat wherein peat is mixed with said fibrous material before or after said breakup.

11. The method of claim 3, wherein said buffering substances comprise argillaceous minerals.

12. The method of claim 4 wherein the heating temperature is more than 100° C. and less than or equal to 120° C.

13. The method of claim 9, wherein said clean, absorbent material comprises at least one material selected from the group consisting of argil, cellulose fibers, waste paper, and cotton.

14. The method of claim 10, wherein said mixture is subsequently dried.

15. The process of claim 1, wherein said high pressure is achieved by means of a thermal screw press.

16. A peat substitute, consisting of fibrous wood or woody material which is broken up under pressure by squeezing and whose fibers are preferably 5 to 30 mm in length, said material being impregnated with active ingredients, one or several of the following active ingredients being used: wetting agents, dyestuffs, pesticides, fungicides, stabilizers, deodorants, fragrances, peat, charcoal, activated coal, brown and hard coal, and dusts of all kinds.

17. The peat substitute of claim 16, wherein wood fibers are present as raw materials which are hardly decomposable by bacteria or fungi but compatible with plants, such as fibers of poplar wood, reducing chips, and tropical woods.

18. A peat substitute produced by a process comprising the step of
impregnating woody materials with auxiliary substances by crushing, defibrating, triturating and breaking up in a breaking machine under high pressure together with said auxiliary substances, wherein said impregnation with auxiliary substances confers upon the product properties which are similar to those of peat and makes it suitable for the cultivation of plants without composting.

19. The peat substitute of claim 18, wherein clean, absorbent material is added in view of increasing the capillarity, i.e., the water retention capacity.

20. The peat substitute of claim 19, wherein said clean, absorbent material comprises at least one material selected from the group consisting of argil, cellulose fibers, waste paper, and cotton.

21. A peat substitute produced by a process comprising the steps of
mixing organic substances with active ingredients and auxiliary substances comprising at least one member selected from the group consisting of pesticides, fungicides, wetting agents, dyestuffs, stabilizers, deodorants, fragrances, peat, coal, charcoal, brown coal, activated carbon, organic and/or mineral dusts, bacteria preparations or pH regulators, and
crushing and defibrating the mixture so as to impregnate it with said active ingredients and auxiliary substances, wherein the crushing and defibrating occur under high pressure.

22. The peat substitute of claim 21, wherein said active ingredients are previously mixed with buffering substances, before said mixing with organic substances.

* * * * *